United States Patent
Li et al.

(10) Patent No.: US 9,189,108 B2
(45) Date of Patent: Nov. 17, 2015

(54) ULTRASOUND MULTI-ZONE HOVERING SYSTEM

(71) Applicant: QUALCOMM Incorporated, San Diego, CA (US)

(72) Inventors: Ren Li, San Diego, CA (US); Michael Leviant, Israel (IL)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 13/972,613

(22) Filed: Aug. 21, 2013

(65) Prior Publication Data

US 2015/0054794 A1    Feb. 26, 2015

(51) Int. Cl.
| | |
|---|---|
| G06F 3/041 | (2006.01) |
| G06F 3/043 | (2006.01) |
| G06F 3/01 | (2006.01) |
| G01S 15/87 | (2006.01) |

(52) U.S. Cl.
CPC ............... *G06F 3/043* (2013.01); *G01S 15/876* (2013.01); *G01S 15/878* (2013.01); *G06F 3/017* (2013.01); *G06F 3/041* (2013.01); *G06F 2203/04108* (2013.01)

(58) Field of Classification Search
CPC ...... G06F 3/043; G06F 3/0436; G06F 3/0433
USPC ................. 345/156–158, 166–168, 173–179; 178/18.01–18.06, 19.02; 367/13, 180
See application file for complete search history.

(56) References Cited

U.S. PATENT DOCUMENTS

| | | | |
|---|---|---|---|
| 7,474,983 B2 | 1/2009 | Mazalek et al. | |
| 2006/0098534 A1* | 5/2006 | Hickling | 367/124 |
| 2008/0100572 A1 | 5/2008 | Boillot et al. | |
| 2010/0199179 A1* | 8/2010 | Suzuki et al. | 715/702 |
| 2011/0122159 A1* | 5/2011 | Bergsten et al. | 345/684 |
| 2011/0148798 A1 | 6/2011 | Dahl | |
| 2012/0038569 A1* | 2/2012 | Yamane et al. | 345/173 |
| 2012/0154110 A1 | 6/2012 | Kim et al. | |
| 2012/0206339 A1* | 8/2012 | Dahl | 345/156 |
| 2012/0274610 A1* | 11/2012 | Dahl | 345/177 |
| 2012/0299820 A1* | 11/2012 | Dahl | 345/156 |

FOREIGN PATENT DOCUMENTS

WO    WO-2011004135 A1    1/2011

OTHER PUBLICATIONS

International Search Report and Written Opinion—PCT/US2014/051519—ISA/EPO—Nov. 11, 2014.

* cited by examiner

*Primary Examiner* — MD Saiful A Siddiqui
(74) *Attorney, Agent, or Firm* — Haynes and Boone, LLP

(57) ABSTRACT

An acoustic tracking system for determining a position of an object is provided that includes one or more receivers that detect an object based on an acoustic signal transmitted by one or more transmitters. The system also includes a processing component that determines a relative position of the detected object with respect to the one or more receivers and the one or more transmitters and selects at least three pairs of receivers and transmitters. Each selected pair includes a receiver from the one or more receivers and a transmitter from the one or more transmitters. The processing component also determines a position of the detected object using the selected at least three pairs of receivers and transmitters.

36 Claims, 8 Drawing Sheets

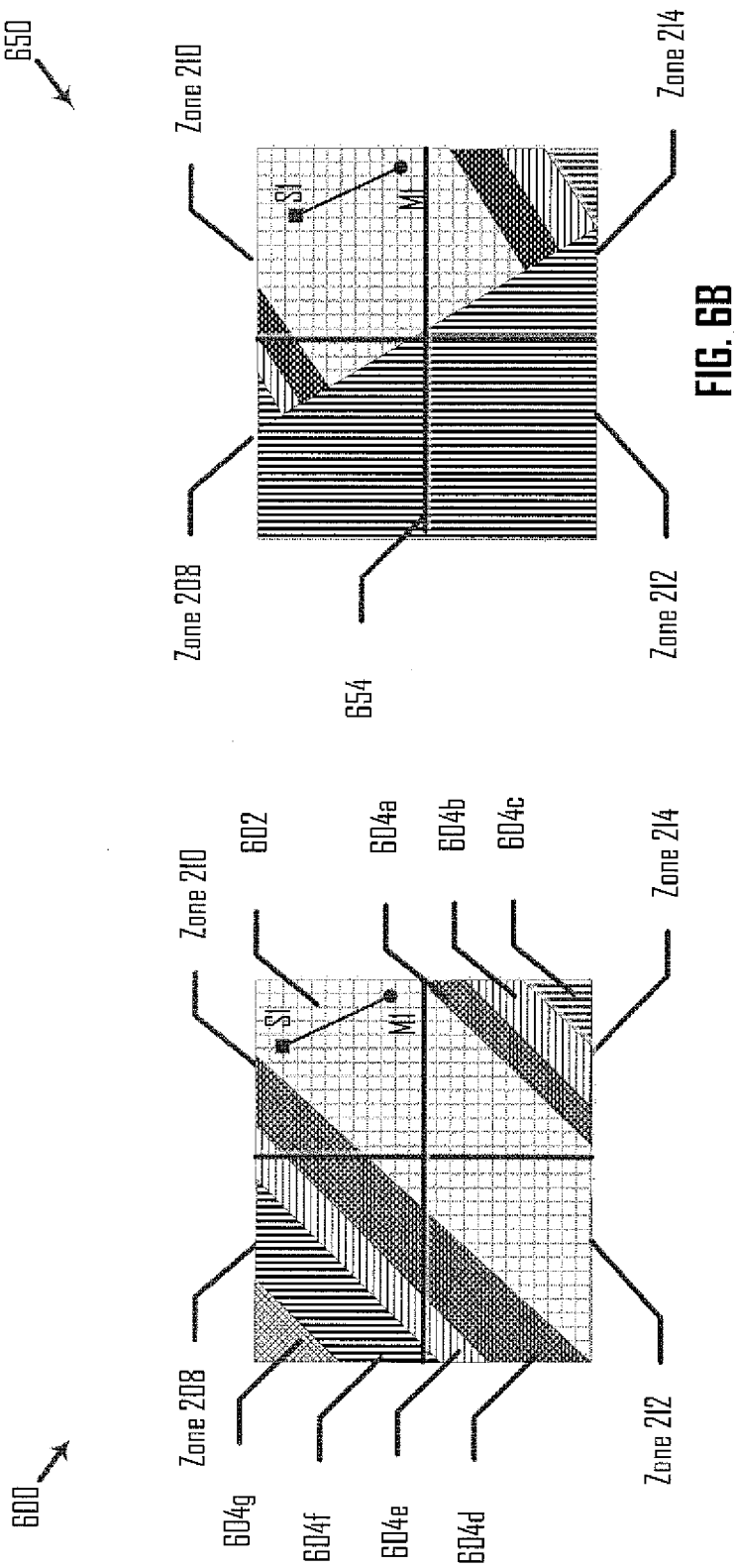

ULTRASOUND MULTI-ZONE HOVERING SYSTEM

TECHNICAL FIELD

Embodiments disclosed herein are generally directed to tracking a position of a user input in an acoustic tracking system.

BACKGROUND

Finger hovering is becoming a highly desirable feature for mobile applications. With finger tracking capability, it may be unnecessary for a user to touch the screen of a mobile device to control a mobile application executing on the mobile device. The hovering feature can be used for remote gesture control, such as photo sliding or map navigation. Unlike camera, electrical field, and self-capacitance or mutual-capacitance based hovering solutions, an ultrasound based hovering system may transmit specially designed broadband modulated ultrasound patterns from ultrasound transmitters.

Ultrasound finger hovering tracking may have an advantage over electrical field based hovering systems and capacitance based hovering systems. For example, an advantage may be that the ultrasound based hovering system uses a minimum amount of hardware. For example, the ultrasound based hovering system may share microphones used by audio and voice applications. Further, the ultrasound based hovering system may operate with adjustable hovering distance and may also work off-screen. Electrical field types of hovering systems may require special electrode pattern design and circuits. Electrical field based hovering systems may only track the movement of the center of gravity of the whole hand and may be unable to track movement corresponding to only the finger. Moreover, the performance of electrical field types of hovering systems may be affected by device grounding conditions. Additionally, a capacitance based hovering system may require a special touchscreen design and the hovering distance may be small (e.g., 2-3 centimeters).

The ultrasound based hovering system may track finger movements by using multiple ultrasound transmitters and microphones. In an example, transmitters (e.g., speakers) transmit ultrasound waves, and microphones receive the reflected signal pattern from the hovering fingertip. The fingertip coordinates may be calculated using triangulation algorithms.

The accuracy of the ultrasound based hovering system, however, may be affected by a number of factors, such as signal-to-noise ratio and transducer bandwidth. An error source may be due to reflections from the non-fingertip parts of the hand. Unlike an ultrasound pen, a hovering finger suffers from unintended reflections from the palm and knuckles. These reflections can cause triangulation errors and discontinuities of the traces. Another error source may be from the fact that the reflection points on the fingertip for each transmitter and receiver pair are not the same. This may result in traces not being smooth, especially in the z-direction.

SUMMARY

There is a need for an improved acoustic tracking system that minimizes the effects of error reflections.

Consistent with some embodiments, there is provided a system for determining a position of an object. The system includes one or more receivers that detect an object based on an acoustic signal transmitted by one or more transmitters. The system also includes a processing component that determines a relative position of the detected object with respect to the one or more receivers and the one or more transmitters. The processing component selects at least three pairs of receivers and transmitters. Each pair includes a receiver from the one or more receivers and a transmitter from the one or more transmitters. The processing component determines a position of the detected object using the selected at least three pairs of receivers and transmitters.

Consistent with some embodiments, there is provided a method of determining a position of an object. The method includes detecting, by one or more receivers, an object based on an acoustic signal transmitted by one or more transmitters. The method also includes determining a relative position of the detected object with respect to the one or more receivers and the one or more transmitters. The method further includes selecting at least three pairs of receivers and transmitters. Each pair includes a receiver from the one or more receivers and a transmitter from the one or more transmitters. The method also includes determining a position of the detected object using the selected at least three pairs of receivers and transmitters.

Consistent with some embodiments, there is provided a computer-readable medium having stored thereon computer-executable instructions for performing operations, including: detecting, by one or more receivers, an object based on an acoustic signal transmitted by one or more transmitters; determining a relative position of the detected object with respect to the one or more receivers and the one or more transmitters; selecting at least three pairs of receivers and transmitters, each pair including a receiver from the one or more receivers and a transmitter from the one or more transmitters; and determining a position of the detected object using the selected at least three pairs of receivers and transmitters.

Consistent with some embodiments, there is provided a system for determining a position of an object. The system includes means for detecting an object based on an acoustic signal transmitted by one or more transmitters. The system also includes means for determining a relative position of the detected object with respect to the one or more receivers and the one or more transmitters. The system further includes means for selecting at least three pairs of receivers and transmitters. Each pair includes a receiver from the one or more receivers and a transmitter from the one or more transmitters. The system also includes means for determining a position of the detected object using the selected at least three pairs of receivers and transmitters.

BRIEF DESCRIPTION OF THE DRAWINGS

FIGS. 6A and 6B are block diagrams illustrating different zone types based on a location of a transmitter, a location of a receiver, and a determined relative position of the detected object with respect to the receiver and the transmitter, consistent with some embodiments.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

Figure 1:
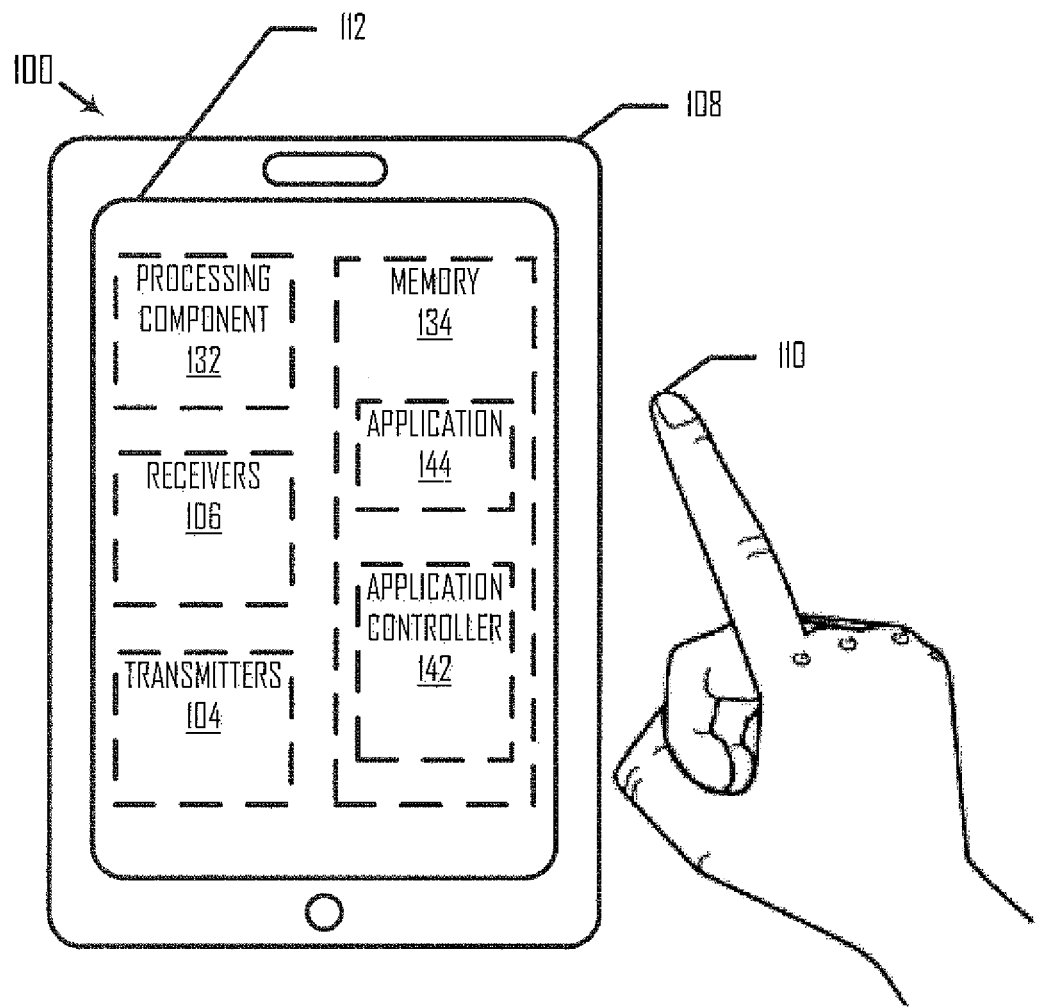
FIG. 1 is a block diagram illustrating an acoustic tracking system 100, consistent with some embodiments.

FIG. 1 is a block diagram illustrating an acoustic tracking system 100, consistent with some embodiments. Acoustic tracking system 100 includes one or more transmitters 104 for transmitting signals and one or more receivers 106 for picking up signals transmitted by transmitters 104. Acoustic tracking system 100 may be embedded, embodied, attached, or otherwise incorporated into a computing device 108, such as a personal computer or a mobile device (e.g., a laptop, mobile smartphone, personal digital assistant, or a tablet computer).

Computing device 108 may be coupled to a screen 112 (e.g., a touch-sensitive screen). Receivers 106 and transmitters 104 may be disposed on computing device 108 having screen 112. The transmitters may transmit a signal pattern of acoustic waves, and object 110 may hover over screen 112, causing the acoustic waves to reflect back toward screen 112. The receivers may receive the reflected signal pattern from object 110 and may determine a position of object 110 based on the reflected signal pattern. The receivers may continuously run such that they are always ready to receive input from the transmitters when computing device 108 is turned on.

In some embodiments, transmitters 104 may transmit an acoustic signal, such as an ultrasonic signal. Transmitters 104 may be any suitable ultrasonic device that includes one or more ultrasonic transducers to generate ultrasonic signals. Receivers 106 may be any suitable acoustic receivers such as a microphone, and transmitters 104 may transmit ultrasonic signals to multiple microphones coupled to acoustic tracking system 100. In some embodiments, transmitters 104 and receivers 106 may respectively be speakers and microphones attached to computing device 108.

As shown in FIG. 1, object 110 may be a hovering fingertip of a hand, and acoustic tracking system 100 may track the movement of the fingertip to detect relatively accurate positions of the fingertip. When acoustic tracking system 100 tracks fingertip 110, reflections from part of the user's hand other than the finger can skew the detection and tracking smoothness accuracy of the finger. The present disclosure provides techniques such that acoustic tracking system 100 may mitigate errors caused by the unintended reflection from parts of the hand.

Acoustic tracking system 100 may also include a processing component 132 and a memory 134. In some embodiments, processing component 132 may be one or more processors, central processing units (CPUs), image signal processors (ISPs), micro-controllers, or digital signal processors (DSPs), graphics processing units (GPUs), and audio signal processors, which may include analog and/or digital audio signal processors. Memory 134 may include a system memory component, which may correspond to random access memory (RAM), an internal memory component, which may correspond to read only memory (ROM), and an external or static memory, which may correspond to optical, magnetic, or solid-state memories, for example.

Memory 134 may correspond to a non-transitory machine-readable medium that includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which processing component 132 is capable of reading.

Further, memory 134 may include an application controller 142 and an application 144. In some embodiments, transmitters 104 may transmit an acoustic signal and receivers 106 may receive a reflected acoustic signal based on a reflection of the transmitted acoustic signals. Processing component 132 may use the reflected acoustic signals to determine a position of object 110 and provide the determined position to application controller 142. Application controller 142 may affect operation of application 144 based on the determined position of object 110. Application 144 may use the coordinates of object 110 to, for example, determine one or more user inputs.

Figure 2:
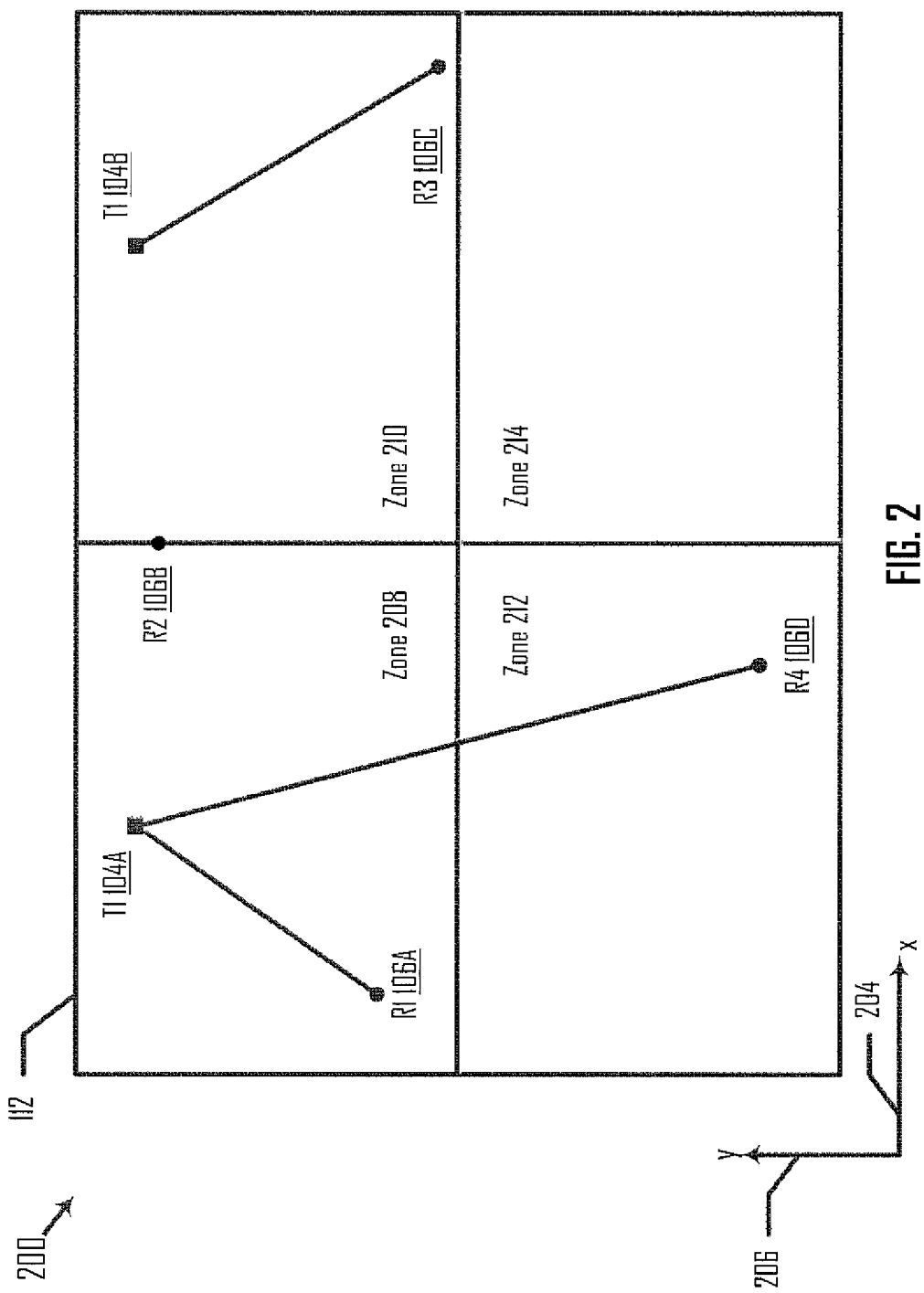
FIG. 2 is a block diagram illustrating a screen partitioned into a plurality of zones, consistent with some embodiments.

FIG. 2 is a block diagram 200 illustrating screen 112 partitioned into a plurality of zones, consistent with some embodiments. As shown in FIG. 2, a portion of screen 112 may be partitioned into a plurality of portions, and each of the portions may correspond to a zone. Each zone may include at least one receiver and at least one transmitter. Screen 112 may be equally partitioned along an x-axis 204 and a y-axis 206 such that screen 112 has four zones. The four zones include a zone 208, a zone 210, a zone 212, and a zone 214. Although four zones are illustrated, embodiments having fewer than four (but at least one zone) or more than four zones are within the scope of this disclosure. Additionally, in other embodiments, screen 112 may be unequally partitioned or partitioned along axes different from x-axis 204 and y-axis 206.

In FIG. 2, acoustic tracking system 100 includes transmitters 104A and 104B and receivers 106A, 106B, 106C, and 106D. Although two transmitters are illustrated, embodiments having one or more than two transmitters are within the scope of this disclosure. Additionally, although four receivers are illustrated, embodiments having fewer than four (but at least one transmitter) or more than four transmitters are within the scope of this disclosure. A quantity of receivers and transmitters may depend on the size of acoustic tracking system 100. For example, if a size of screen 112 is small, less area may be available for object 110 to hover over. Thus, fewer transmitters and/or receivers may be incorporated into acoustic tracking system 100 compared to an embodiment having a larger screen.

In some embodiments, one or more of receivers 106A, 106B, 106C, and 106D detect object 110 based on an acoustic signal transmitted by one or more of transmitters 104A and 104B. The acoustic signals received by the receivers may be reflected acoustic signals based on object 110 hovering over screen 112. For example, one or more of receivers 106A, 106B, 106C, and 106D may detect object 110 within a proximity of screen 112. Processing component 132 may determine a relative position of the detected object with respect to the one or more receivers and the one or more transmitters.

Figure 3:
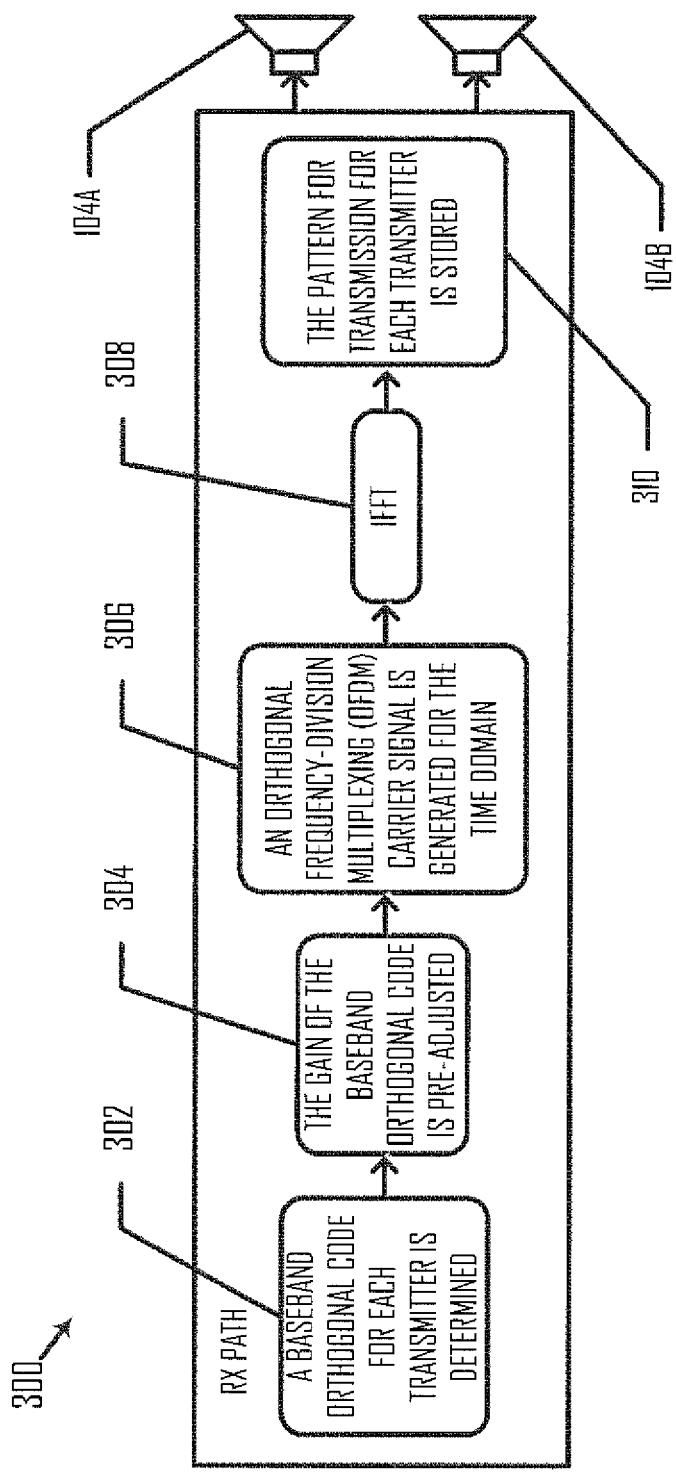
FIG. 3 is a flow diagram illustrating the generation of signal patterns by transmitters, consistent with some embodiments.

Each transmitter may transmit a different acoustic signal pattern with respect to each other. FIG. 3 is a flow diagram 300 illustrating the generation of signal patterns by transmitters 104A and 104B, consistent with some embodiments. At a step 302, a baseband orthogonal code for each transmitter is determined. An orthogonal code is a code that has zero cross correlation. Similar to Code Division Multiple Access (CDMA), orthogonal code may be used to generate time domain waveforms. In an example, at the receiver, the transmitted signal pattern may be recovered by correlating the orthogonal code to the received signal given the fact that the transmit and receive path of hovering system are in synchronization. Other non-orthogonal signals may also be used, such as pseudo noise (PN) sequence, or other types of codes that exhibit small cross correlation and large auto correlation.

At a step 304, the gain of the baseband orthogonal code is pre-adjusted. At a step 306, an orthogonal frequency-division multiplexing (OFDM) carrier signal is generated for the time domain. In some embodiments, for a transmitter to generate a signal between 40 KHz and 60 KHz, the range of the carrier signal is between 30 KHz and 70 KHz. At a step 308, the inverse fast Fourier transform (IFFT) is applied to the carrier signal. The IFFT is applied to transfer the carrier signal into a time domain for the different transmitters. At a step 310, the pattern for transmission for the particular transmitter is stored (e.g., in memory 134). Similar steps may be applied to different transmitters such that different patterns are stored for each of the transmitters.

When a receiver receives an acoustic signal, the receiver may receive a combination of the signals transmitted by transmitters 104A and 104B. The receiver may distinguish which signal came from which transmitter by applying the fast Fourier transform (FFT) to the received signal and extracting the carrier signal through demodulation by applying the orthogonal codes. Processing component 132 may extract acoustic signals received by each receiver of the plurality of receivers. For each acoustic signal received at a receiver, processing component 132 may determine which transmitter transmitted the respective acoustic signal. The received acoustic signals may be compared to an expected signal by processing component 132 according to instructions stored in memory 134 and an expected signal stored in memory 134 or generated by processing component 132, for example. Processing component 132 may be provided as hardware, software, or firmware, or combinations thereof in various embodiments.

Referring back to FIG. 2, eight different (transmitter, receiver) pairs are available for input to determine a position of the detected object. The eight different (transmitter, receiver) pairs include: (S1, M1), (S1, M2), (S1, M3), (S1, M4), (S2, M1), (S2, M2), (S2, M3), and (S2, M4). It may be beneficial to select a pair based on the determined relative position of object 110 with respect to the one or more receivers and the one or more transmitters such that the selected pair minimizes the error reflections discussed. To determine a three-dimensional coordinate of object 110, it may be beneficial to select at least three (transmitter, receiver) pairs. If more than three pairs are used as inputs to determine the position of the detected object, an over-determined system is provided that may more accurately determine the position of the detected object. An over-determined system provides more equations to determine the position of the detected object.

Of the eight available (transmitter, receiver) pairs, processing component 132 determines which pairs to select to be used as input to determine the position of the detected object. Processing component 132 may select at least three pairs of transmitters and receivers, where each pair includes a receiver from receivers 106A, 106B, 106C, and 106D and a transmitter from transmitters 104A and 104B. For simplicity and brevity, the disclosure may describe three pairs of transmitters and receivers being selected as input to determine a position of the detected object (e.g., by processing component 132). This is not intended to be limiting, and other embodiments having more than three pairs of transmitters and receivers being selected as input to determine the position of the detected object are also within the scope of this disclosure.

In some embodiments, processing component 132 selects a (transmitter, receiver) pair by matching the determined relative position of the detected object to a zone among a plurality of zones. The detected object may be matched to a particular zone when the detected object is determined to be hovering over that particular zone. Selecting the (transmitter, receiver) pair may further include selecting the pair based on the matched zone and its zone type. A zone may be of different zone types. A zone type may be, for example, a safe zone, an ambiguity zone, and a non-safe zone. Other safe zone types are within the scope of the present disclosure. A safe zone may indicate that no error reflection relative to the particular (transmitter, receiver) pair is present. Further, if the error reflection is below a threshold, the particular (transmitter, receiver) pair may be determined to be in a safe zone.

According to an embodiment, processing component 132 selects a subset of the (transmitter, receiver) available pairs to be used as input to determine a position of the detected object. In an example, processing component 132 may select the (transmitter, receiver) pairs to be used as input based on which zone matches the relative position of the detected object and whether the matched zone is a safe zone. In an example, processing component 132 may select the safe zones and avoid selecting zones that are not of the safe type. Accordingly, processing component 132 may select pairs that do not include or mitigate the inclusion of reflection from other parts of the hand. The non-selected (transmitter, receiver) pairs may be pairs that include "unsafe" (e.g., ambiguity or non-safe zones) levels of reflection from other parts of the hand. In another example, processing component 132 may also select ambiguity zones that are determined to be below an error reflection threshold.

According to another embodiment, processing component 132 selects all of the (transmitter, receiver) available pairs to be used as input to determine a position of the detected object. In an example, processing component 132 may assign a weight to at least one pair of the three pairs of receivers and transmitters (e.g., all available pairs) based on the matched zone. The weight may be assigned based on a zone type of the matched zone. For each matched zone, processing component 132 may determine the zone type of the matched zone. In an example, a safe zone may be assigned a greater weight than an ambiguity zone and a non-safe zone, and an ambiguity zone may be assigned a greater weight than a non-safe zone. In this example, the (transmitter, receiver) pairs that correspond to a safe zone may have more weight compared to other zones, increasing the accuracy of determining the position of the detected object. In some embodiments, the assigned weight for a (transmitter, receiver) pair corresponding to a non-safe zone may be zero to avoid having the input of the received acoustic input from this pair used to determine the position of the object.

Processing component 132 may determine for a particular (transmitter, receiver) pair, a zone type of a zone (e.g., safe zone, ambiguity zone, and/or non-safe zone). Each (transmitter, receiver) pair may be located in a different zone type depending on various factors, such as whether the user is using her left or right hand and an orientation of computing device 108, and the zone type is based on a particular (transmitter, receiver) pair. For example, the configuration of zone types may be different when the user rotates her hand and uses a different hand (e.g., left hand versus right hand). For any kind of hand orientation as well as use of either the left or the right hand, processing component 132 may select combination pairs for each zone to minimize error reflections from other parts of the hand. Accordingly, processing component 132 may select a combination of input receivers that is robust enough to handle the different orientations and use of the left or right hand.

In some embodiments, to determine a zone type of a zone for a particular (transmitter, receiver) pair, processing component 132 applies the following equations:

$$\frac{x - x0}{\cos\alpha} + y'\tan\alpha = x', \tag{1}$$

and $$\frac{y'}{\cos\alpha} + (x - x0)\tan\alpha = y - y0. \tag{2}$$

Figure 4:
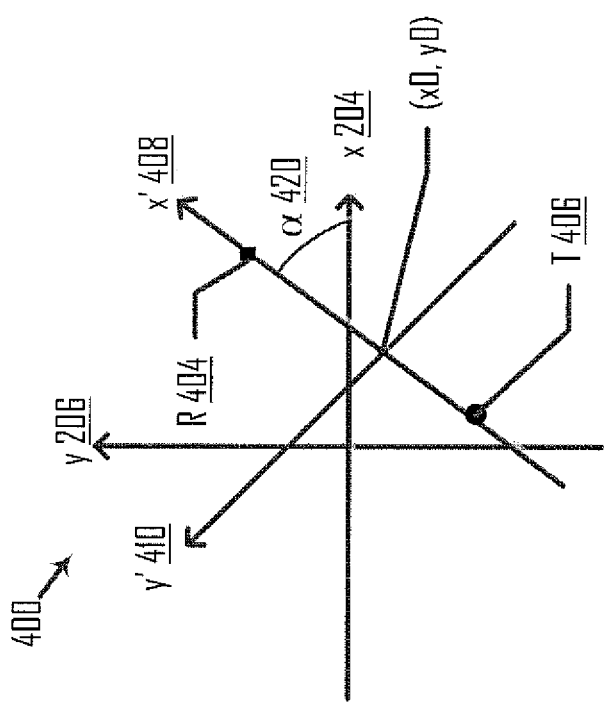
FIG. 4 is a diagram illustrating a transmitter and receiver pair relative to two coordinate axes, consistent with some embodiments.

FIG. 4 is a diagram 400 illustrating a (transmitter, receiver) pair relative to two coordinate axes (x, y) and (x', y), consistent with some embodiments. In equations (1) and (2), x is an initial x-axis of screen 112, y is an initial y-axis of screen 112, coordinate (x0, y0) is a center point between a respective receiver and a respective transmitter, x' is a rotated x-axis that intersects with the respective receiver and the respective transmitter, y' is a rotated y-axis that is perpendicular to the rotated x'-axis, and angle α is a rotation angle between the initial (x, y) axis and the rotated (x', y') axis.

Diagram 400 includes x-axis 204 and y-axis 206 of screen 112, a receiver 404, and a transmitter 406. The coordinate (x0, y0) is the approximate or exact center point between receiver 404 and transmitter 406, and an x'-axis 408 and a y'-axis 410 are axes that are rotated relative to x-axis 204 and y-axis 206 based on coordinate (x0, y0). As shown in FIG. 4, x'-axis 408 intersects with transmitter 406 and receiver 404. An angle α 420 is a rotation angle between two coordinate axes. In FIG. 2, angle α 420 is the rotation angle from x-y axis (204, 206) to x'-y' axis (408, 410) and is independent of the quantity and size of zones.

Processing component 132 may further apply the following equations to determine for the particular (transmitter, receiver) pair, the zone type of the zone:

$$a = \sqrt{d^2 + b^2} = \frac{1}{2}(\sqrt{(x' + d)^2 + y'^2} + \sqrt{(d - x')^2 + y'^2}), \tag{3}$$

$$c = \sqrt{1 - \frac{y'^2}{b^2}}, \tag{4}$$

$$a' = a * c, \tag{5}$$

$$b' = b * c, \tag{6}$$

and $$\frac{x'^2}{a^2} + \frac{y'^2}{b^2} = 1. \tag{7}$$

In equation (3), d is half the distance between the respective receiver and the respective transmitter. Using (x, y, d), variables (α, x', y', a, b) may be determined using the equations provided in the present disclosure.

Figure 5:
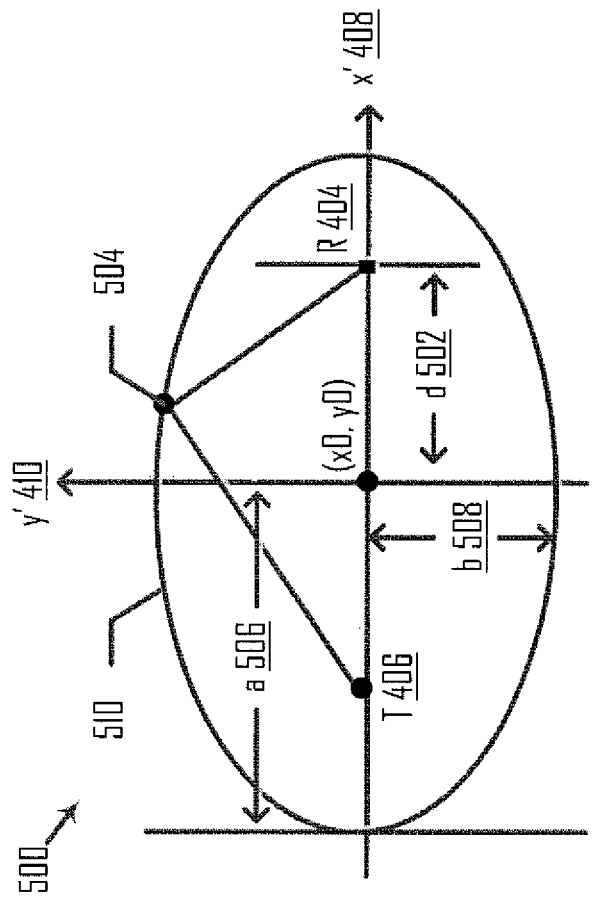
FIG. 5 is a diagram illustrating the (transmitter, receiver) pair relative to a rotated axis, consistent with some embodiments.

FIG. 5 is a diagram 500 illustrating the (transmitter, receiver) pair relative to an axis rotated relative to x-axis 204 and y-axis 206, consistent with some embodiments. In diagram 500, coordinate (x0, y0) is at an origin of the (x', y') axis. A distance "d" 502 is half the distance between receiver 404 and transmitter 406. Further, a line segment that intersects with transmitter 406 and a line segment that intersects with receiver 404 intersects at a right angle at point 504. A distance "a" 506 extends from the y'-axis to the ellipsoid's horizontal endpoint, and a distance "b" 508 extends from the x'-axis to the ellipsoid's vertical endpoint. An ellipsoid 510 may intersect point 504, a point extending distance "a" 506 from the y'-axis, and a point extending distance "b" 508 from the x'-axis.

Processing component 132 may further apply the following equations to determine for the particular (transmitter, receiver) pair, the zone type of the zone:

$$\frac{(a' - L)^2}{a'^2} + \frac{h^2}{b'^2}, \tag{8}$$

Referring to equation (8), if object 110 is a fingertip of a hand including a palm and a knuckle, L is an approximate width of the palm, and h is an approximate distance from the fingertip to the knuckle. The hand may be a left hand or a right hand. In some embodiments, when a result of equation (8) is greater than or equal to one, the zone type is of a first zone type. When equation (8) is less than one, the zone type is of a second zone type. The first zone type may be a safe zone that has a greater weight than the second zone type, which may be an ambiguity zone or a non-safe zone. Further, the following constraint may be applied such that when |x'|<d, |y'|>Δ (Δ>0), where Δ is an approximate size of the diameter of the transmitter port hole (e.g., opening hole).

Using (α, x', a, b), variables (a', b') may be determined using the equations provided in the present disclosure. Equations (1)-(8) may be applied by processing component 132 to determine for any particular (transmitter, receiver) pair whether, for example, the zone is a safe zone.

FIGS. 6A and 6B are block diagrams 600, 650 illustrating different zone types based on a location of transmitter 104B in FIG. 1, a location of receiver 106C in FIG. 1, and a determined relative position of the detected object with respect to receiver 106C and transmitter 104B, consistent with some embodiments.

Diagrams 600 illustrate safe zones, ambiguity zones, and non-safe zones when the user is using her left hand. Diagrams 650 illustrate safe zones, ambiguity zones, and non-safe zones when the user is using her right hand. In diagrams 600, 650, section 602 may represent a safe zone and sections 604a-604g may represent ambiguity zones and non-safe zones. When a relative position of object 110 with respect to transmitter 104B and receiver 106C is detected as hovering over an ambiguity zone or non-safe zone, other parts of the user's hand aside from the fingertip are more likely to cause reflection and skew the position determination of object 110.

Referring to diagram 600, when the user uses her left hand and the detected object is left of transmitter 104B and receiver 106C pair, a large portion of the left side of screen 112 falls into the safe zone. In this scenario, much of the reflection is from the user's fingertip rather than other parts of the user's hand (e.g., palm or knuckle) and those signals reflect into receiver 106C. In the upper-left hand section of screen 112 in FIG. 6A, however, other parts of the user's hand aside from her fingertip may cause the reflection and this section is illustrated as an ambiguity zone and/or non-safe zone.

Referring to diagram 650, which also includes transmitter 104B and receiver 106C pair, when the user uses her right hand, a large portion 654a of the left side of screen 112 falls into an ambiguity zone and/or non-safe zone. In this scenario, much of the reflection is from other parts of the user's hand aside from the user's fingertip and those signals reflect into receiver 106C. Additionally, in the lower-right side of screen 112 in FIG. 6A, other parts of the user's hand aside from her fingertip may cause the reflection and sections 654b-device are also illustrated ambiguity zones and/or non-safe zones.

In diagram 650, if the user's hand is in zone 208 or 212, the shortest distance reflected to receiver 106C may be, for example, the user's pinky finger, palm, or knuckle rather than fingertip. Accordingly, if the relative position of the user's finger is in zone 208 and that reflection is received at receiver 106C, the reflection includes errors based on the unintended reflection from parts of the hand. In contrast, section 652 may represent a safe zone and is in a big portion of zone 210 and 214. If the relative position of the user's finger is in zone 210 or 214 and that reflection is received at receiver 106C, the reflection has a higher probability of being accurate and sections of these zones may be considered safe zones.

Processing component 132 may apply equations (1)-(8) for each (transmitter, receiver) pair to determine the zone type of a zone relative to the locations of the (transmitter, receiver) pair. Table A is an illustration of a table that includes each of the available (transmitter, receiver) pairs in FIG. 2 and which zones fall within a safe zone for each hand, consistent with some embodiments. Based on a zone type, processing component 132 may select at least three (transmitter, receiver) pairs as input to determine a position of the detected object.

TABLE A

| T1, T2 | R1-R4 | Safe zone (zone #) - left hand | Safe zone (zone#) - right hand |
|---|---|---|---|
| T1 | R1 | 1, 2, (3) | 1, 3 |
| T1 | R2 | (0), 1 | (0), 1, (2), 3 |
| T1 | R3 | 0, 1, (2) | 0, 1, 2, 3 |
| T1 | R4 | 0, 1, 2, (3) | 1, (2), 3 |
| T2 | R1 | 0, 1, 2, 3 | 0, 1, (3) |
| T2 | R2 | 0, (1), 2, (3) | 0, (1) |
| T2 | R3 | 0, (2) | 0, 1, 2, 3 |
| T2 | R4 | 0, 2 | 0, 1, 2, 3 |

A zone in a "( )" denotes a safe zone with a partial area of ambiguity.

TABLE B

| | Zone 0 | Zone 1 | Zone 2 | Zone 3 |
|---|---|---|---|---|
| Left hand | | | | |
| T1 | (2)*, 3, 4 | 1, 2, 3, 4 | 1, (3), 4 | (1), (4) |
| T2 | 1, 2, 3, 4 | 1, (2) | 1, 2, (3), 4 | 1, (2) |
| Right hand | | | | |
| T1 | (2), 3 | 1, 2, 3, 4 | (2), 3, (4) | 1, 2, 3, 4 |
| T2 | 1, 2, 3, 4 | 1, (2), 3, 4 | 3, 4 | (1), 3, 4 |
| Overall safe zone mics | | | | |
| T1 | (2), 3 | 1, 2, 3, 4 | (3), (4) | (1), (4)** |
| T2 | 1, 2, 3, 4 | 1, (2) | (3), 4 | (1) |

A receiver in a "( )*" denotes a safe zone with a small area of ambiguity. A receiver in a "( )**" denotes that at least three pairs are selected for each zone. In some embodiments, processing component 132 relaxes the safe zone criteria to enable selection of at least three (transmitter, receiver) pairs for each zone. Processing component 132 may relax the safe zone criteria if, for example, fewer than three (transmitter, receiver) pairs are in a safe zone.

The closer the user's finger is to screen 112, the fewer (transmitter, receiver) pairs that may meet the safe zone criteria. Likewise, the farther the user's finger is from screen 112, the more (transmitter, receiver) pairs that may meet the safe zone criteria. In a first example and referring to the "left hand" and "zone 0" columns in Table B, for transmitter T1, receivers {R2, R3} may be selected and for transmitter T2, receivers {R1, R2, R3, R4} may be selected. As such, processing component 132 may select these six (transmitter, receiver) pairs (e.g., (T1, R2), (T1, R3), (T2, R1), (T2, R2), (T2, R3), (T2, R4)) and use these as input to determine the position of the detected object. In a second example and referring to the "left hand" and "zone 3" columns in Table B, for transmitter T1, receivers {R1, R4} may be selected and for transmitter T2, receiver {R1} may be selected. As such, processing component 132 may select these three (transmitter, receiver) pairs (e.g., (T1, R1), (T1, R4), (T2, R1)) and use these as input to determine the position of the detected object. The user's finger is likely farther in the first example compared to the second example.

Processing component 132 may determine a position of the detected object using the selected pairs of receivers and transmitters (e.g., the three (transmitter, receiver) pairs). In some embodiments, processing component 132 determines a three-dimensional coordinate position of the detected object. In some embodiments, the z-coordinate of the three-dimensional coordinate position of the detected object is fixed and processing component 132 selects two or more (transmitter, receiver) pairs as input to determine the position of the detected object.

Hovering accuracy may be affected by many factors, such as signal symbol design, signal bandwidth, signal signal-to-noise ratio, transducer Q/sensitivity, transducer geometry, finger orientation, hand shape body/background reflection, acoustic porting quality, and orientation of the computing device. The Q may refer to the Q factor of the transducer and may be defined as the ratio of the center frequency versus the bandwidth.

When a user hovers her finger above screen 112, for a particular coordinate (x, y, z) location of object 110, processing component 132 may calculate the total time of flight distance from any of the transmitters to object 112 to any of the receivers.

In some embodiments, to determine a total distance from the ith transmitter to object 110 (e.g., fingertip) to a receiver, processing component 132 applies the following equation:

$$R_i = \sqrt{(x-xi)^2 + (y-yi)^2 + (z-zi)^2} + \sqrt{(x-sxi)^2 + (y-syi)^2 + (z-szi)^2} \quad (9)$$
$$= R_{ir} + R_{it},$$

In equation (9), $R_i$ is the total time of flight distance. A coordinate (x, y, z) is the location of object 110 (e.g., fingertip) that is to be determined, coordinate $(x_i, y_i, z_i)$ is the ith receiver, coordinate $(t_{xi}, t_{yi}, t_{zi})$ is the ith transmitter, $R_{ir}$ is a distance between the ith receiver and object 112, and $R_{it}$ is a distance between the ith transmitter and object 112. Each (transmitter, receiver) pair may have a different time of flight distance (e.g., different $(R_{im}+R_{is})$ values).

In some embodiments, to determine a change in R, processing component 132 applies the following equation:

$$\Delta R = P \Delta X = e, \quad (10)$$

In equation (10), P may be a partial derivate of R with respect to coordinate (x, y, z) for each R. To determine P, processing component 132 applies the following equations for a one transmitter case:

$$P = \begin{bmatrix} \frac{\partial R_1}{\partial x} & \frac{\partial R_1}{\partial y} & \frac{\partial R_1}{\partial z} \\ \frac{\partial R_2}{\partial x} & \frac{\partial R_2}{\partial y} & \frac{\partial R_2}{\partial z} \\ \frac{\partial R_3}{\partial x} & \frac{\partial R_3}{\partial y} & \frac{\partial R_3}{\partial z} \\ \frac{\partial R_4}{\partial x} & \frac{\partial R_4}{\partial y} & \frac{\partial R_4}{\partial z} \end{bmatrix} \quad (11)$$

$$= \begin{bmatrix} \frac{(x-x1)}{R_{1r}} + \frac{(x-sx1)}{R_{1t}} & \frac{(y-y1)}{R_{1r}} + \frac{(y-sy1)}{R_{1t}} & \frac{(z-z1)}{R_{1r}} + \frac{(z-sz1)}{R_{1t}} \\ \frac{(x-x2)}{R_{2r}} + \frac{(x-sx2)}{R_{2t}} & \frac{(y-y2)}{R_{2r}} + \frac{(y-sy2)}{R_{2t}} & \frac{(z-z2)}{R_{2r}} + \frac{(z-sz2)}{R_{2t}} \\ \frac{(x-x3)}{R_{3r}} + \frac{(x-sx3)}{R_{3t}} & \frac{(y-y3)}{R_{3r}} + \frac{(y-sy3)}{R_{3t}} & \frac{(z-z3)}{R_{3r}} + \frac{(z-sz3)}{R_{3t}} \\ \frac{(x-x4)}{R_{4r}} + \frac{(x-sx4)}{R_{4t}} & \frac{(y-y4)}{R_{4r}} + \frac{(y-sy4)}{R_{4t}} & \frac{(z-z4)}{R_{4r}} + \frac{(z-sz4)}{R_{4t}} \end{bmatrix}$$

Processing component 132 may determine a (x, y, z) coordinate position of the detected object based on the acoustic input received by multiple (transmitter, receiver) pairs. In an example, to determine a (x, y, z) coordinate position from the selected (transmitter, receiver) pairs, processing component 132 may apply a least square triangulation algorithm to the selected (transmitter, receiver) pairs.

P may also be determined for a system including more than one transmitter. In an example, for a two transmitter case, P may be extended from a 4×3 matrix to an 8×3 matrix. In such an example, equation (9) may be used to calculate a different set of R1, R2, R3, R4 using the coordinates of the second transmitter.

In some embodiments, to determine the (x, y, z) coordinate position of the detected object, processing component 132 applies the following equation:

$$\Delta X = (P^T P)^{-1} (P^T \Delta R), \quad (12)$$

In equation (12), $P^T$ is the transpose of P, $$X_t = \begin{pmatrix} x \\ y \\ z \end{pmatrix},$$

and $\Delta X = X_{t+1} - X_t$, which may be defined as the state vector coordinate (x, y, z). Further, $\Delta X$ corresponds to a change of coordinate (x, y, z) based on a function of time. For each iteration, processing component 132 may know the change and history of the coordinates (x, y, z) so that the new coordinate (x, y, z) may be calculated.

In some embodiments, to determine an error covariance of $\Delta X$, processing component 132 applies the following equation:

$$C_{\Delta x} = (P^T Q^{-1} P)^{-1} \quad (13)$$

In some embodiments, to determine an approximate hovering accuracy, processing component 132 applies the following equation:

$$\text{trace}(P^T Q^{-1} P)^{-1} \quad (14)$$

In equations (13) and (14), to determine a ranging error covariance of matrix Q, processing component 132 applies the following equation:

$$Q = \begin{bmatrix} \sigma_1^2 & 0 & 0 & 0 \\ 0 & \sigma_2^2 & 0 & 0 \\ 0 & 0 & \sigma_3^2 & 0 \\ 0 & 0 & 0 & \sigma_4^2 \end{bmatrix} \quad (15)$$

In equation (15), a may refer to the ranging error covariance value. The error covariance of $\Delta X$ may be used to determine the geometric accuracy of object 110 hovering above screen 112.

The present disclosure provides techniques to refine the determined position of the detected object so that the output is more accurate.

Figure 7:
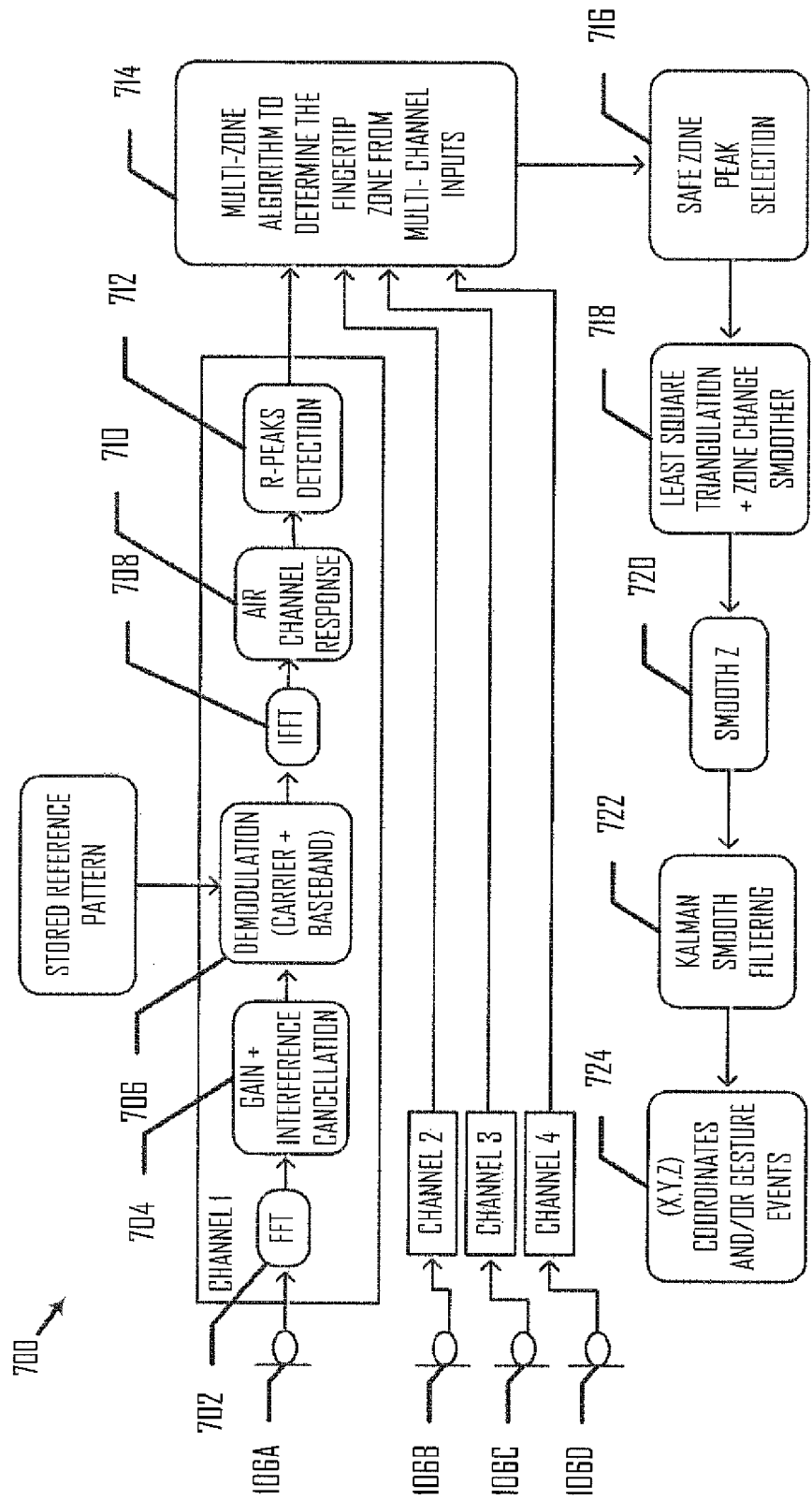
FIG. 7 is a block diagram illustrating a process flow for refining the determined position of the detected object, consistent with some embodiments.

FIG. 7 is a block diagram 700 illustrating a process flow for refining the determined position of the detected object, consistent with some embodiments. Diagram 700 includes four physical receivers 106A, 106B, 106C, and 106D. Receivers 106A, 106B, 106C, and 106D receive input that is fed into a multi-zone algorithm to determine the fingertip zone from multi-channel inputs.

The following is a description of receiver 106A. This description applies as well to receivers 106B, 106C, and 106D. Receiver 106A receives an acoustic signal pattern in a channel 1. At a step 702, processing component 132 may apply the FFT to the received acoustic signal pattern. In an example, processing component 132 may translate the FFT into a frequency domain based on the received input. At a step 704, processing component 132 may apply a gain and interference cancellation to an output of step 702. The interference detection may be in frequency domain, and the cancellation filtering may be applied in the time domain or frequency domain.

At a step 706, a stored reference pattern may be used to demodulate the carrier and baseband acoustic signal to calculate the correlation of the channel response. At a step 708, the IFFT may be applied to an output of the demodulated acoustic signal. The output may be the demodulated signal in frequency domain. In an example, processing component 132 translates an output of step 706 into the time domain using IFFT. At a step 710, an air channel response between the transmitter, finger, and receiver is determined. At a step 712, the receiver peak is detected. In an example, a receiver peak sample index may be detected when the peak value is in a region whose values exceed a predetermined threshold curve.

At a step 714, an output of the peak detection is fed into a multi-zone algorithm to determine the fingertip zone. The multi-zone algorithm may also receive the detected receiver peaks for receivers 106B, 106C, and 106D. The (transmitter, receiver) pairs may be selected using the techniques described in the present disclosure. In an example, if two transmitters and four receivers are available, eight pairs may be available.

At a step 716, a safe zone peak selection is performed. The selection of the safe zone peak may include selecting sample indexes of peak values that correspond to one or more finger tips from the time domain channel impulse response. The peak, which may refer to the time domain similar to the channel response for each input, may be calculated. Based on this calculation, the peak of the input may be determined. In an example, a single peak is determined for tracking a single finger. In another example, a multiple peak is determined for tracking multiple fingers.

At a step 718, the least square triangulation algorithm and zone change smoother may be used. The peak may be used in the least square triangulation algorithm. The least square triangulation algorithm may smooth out the zone changes to smooth out the calculation. In an example, processing component 132 may use different (transmitter, receiver) pairs for each zone and data from multiple zones. Accordingly, calculation discontinuities may occur when object 110 crosses zones, potentially resulting in large sudden changes and discontinuity of coordinates. In some embodiments, to further refine the determined (x, y, z) coordinate position of the detected object and to reduce the zone crossing effects, processing component 132 may apply a weighted smoothing algorithm. Based on a proximity of object 110 to screen 112, when object 110 is located within a threshold of a boundary between two safe zones, a weighted least square triangulation algorithm may be applied to smooth out the sudden change of a calculation result that is fed into the localization algorithm to determine a more accurate position of the detected object.

In some embodiments, processing component 132 determines whether object 110 is located within a threshold of a boundary between two zones of a first zone type (e.g., safe zone). When the object is determined to be located within the threshold of the boundary between two zones of the first zone type, processing component 132 may assign a weight to at least one pair of receivers and transmitters. Processing component 132 may determine a position of the detected object by using the one or more weights assigned to the respective pair. Accordingly, processing component 132 may further refine the three-dimensional coordinate position of the detected object by applying the weighted least square triangulation equation using the weights assigned to the respective pair.

In some embodiments, to determine a refined (x, y, z) coordinate of the detected object, processing component 132 applies the following equation:

$$\Delta X = ((W_0|x=x0)^* P^T P_{zone0} + (W_1|x=x0)^* P^T P_{zone1})^{-1} \\ ((W_0|x=x0)^* P^T \Delta Rzone0 + (W_1|x=x0)^* P^T \Delta Rzone1) \quad (16)$$

Equation (16) is a weighted least square triangulation equation that may be used by processing component 132 to determine the refined (x, y, z) coordinate of the detected object when the object is determined to be located within the threshold of the boundary between two zones of the first zone type. A coordinate output of step 718 may be used as an input into a step 720.

At step 720, the smooth-Z algorithm may be used to further smooth out the calculation and determine a more accurate position of the detected object. Unlike a digital pen that transmits acoustic signals, due to the shape and size variations of a user's fingertip, reflected acoustic signals may not be from the same point. This may cause discontinuities of the (x, y, z) coordinate trace that the smoothing algorithm (e.g., least square triangulation equation or weighted least square triangulation equation) may be unable to correct. Geometric dilution of precision (GDOP) may show the accuracy based on an assumption of the point source, which works for a digital pen but does not work for fingertip reflections. Given the typical shape of a fingertip (e.g., circular shape of an object) reflection and for different (transmitter, receiver) pairs, a small change may result in a large z-coordinate value change. Additionally, different users may have different finger shapes and the fingertip reflection may be different depending on the user's hand orientation. Thus, the areas that reflect the acoustic signal back to the receivers may be different.

When the user's finger is stationary, there is no movement of the fingertip. When the user starts to rotate her finger, however, the detected object will move and may be detected at different locations because the reflection point is different. Additionally, the bandwidth for acoustic signal detection may be limited. A slight change of finger rotation or angle may cause detection variations. It may be desirable to convert the reflection back to a point source, and the subsequent movement of the object may use the point source as a reference. To address this issue, processing component 132 may determine a refined z-coordinate value to find the best reflection point.

In some embodiments, for a plurality of pairs of receivers and transmitters, processing component 132 determines a z-coordinate output based on the x- and y-coordinates of the determined three-dimensional coordinate position (e.g., output of step 718) and further based on a location of the receiver in the respective pair and a location of the transmitter in the respective pair. Processing component 132 may identify a refined z-coordinate having a least change compared to one or more determined z-coordinate outputs. Processing component 132 may update a z-coordinate of the determined three-dimensional coordinate position of the detected object with the refined z-coordinate.

Processing component 132 may determine the (x, y, z) coordinate position of the detected object using the selected (transmitter, receiver) pairs. To determine a more accurate z-coordinate in the (x, y, z) coordinate position of the detected object determined by processing component 132, a smooth-Z point source algorithm may be applied. The smooth-Z point source algorithm may be used to handle the accuracy of the reflection problem discussed above. Applying the smooth-Z point source algorithm may include selecting the best matching (transmitter, receiver) pair delay path to recalculate the z-coordinate.

To further refine the z-coordinate, processing component 132 may calculate the total time of flight distance (see equation (9)) for each selected (transmitter, receiver) pair. In equation (9), processing component 132 may use the value of x in the determined (x, y, z) coordinate position of the detected object (e.g., the value of x in the output of step 718) and use the value of y in the determined (x, y, z) coordinate position of the detected object (e.g., the value of x in the output of step 718). As such, for a known ($R_i$, x, y), a refined z-coordinate may be determined.

From the previous calculation of equation (9), the total time of flight distance is known. Based on the known total time of flight distance and the x, y values, processing component 132 may determine a refined z-coordinate that has the least change compared to the previous z-coordinates. Processing component 132 may update the z-coordinate in the determined (x, y, z) coordinate position of the detected object with the refined z-coordinate. In an example, processing component 132 selects a transmitter T1 and pairs the transmitter with four receivers R1, R2, R3, and R4. For each of the four (transmitter, receiver) pairs {(T1, R1), (T1, R2), (T1, R3), (T1, R4)}, processing component 132 may calculate with respect to the receivers four different z-coordinate values for object 110 using the given x-coordinate and y-coordinate from the determined position of the detected object. Processing component 132 may identify a refined z-coordinate having a least change compared to the other z-coordinate outputs. A coordinate output of step 720 may be used as an input into a step 722.

At step 722, a Kalman smooth filtering algorithm may be used to further smooth out the calculation and determine a more accurate position of the detected object. A smooth filtering equation may be applied to the refined determined position of the detected object (e.g., the coordinate output of step 720) to determine a more accurate position of the detected object. The smooth filtering equation may be, for example, the Kalman smooth filtering equation. The Kalman smooth filtering equation may be used to smooth out the calculated (x, y, z) coordinates, and the filter estimate (x, y, z) coordinates may be based on noisy (x, y, z) input.

In some embodiments, in applying the Kalman smooth filtering equation, processing component 132 applies a filter equation to the updated three-dimensional coordinate position and determines a filtered three-dimensional coordinate position of the detected object based on applying the filter equation.

The Kalman smooth filtering equation may be used to describe the configuration. Table C is an illustration of a table that includes example configuration information.

TABLE C

| | |
|---|---|
| n = 3 | n = number of states, 3 dimensional coordinates (x, y, z) |
| q = 0.1 | Standard deviation of the process |
| QQ = $q^2$*eye(n) | Covariance of process |
| ss = [1; 1; 1] | Initial state, (initial value of coordinates) |
| x = ss; | Initial state |
| P = eye(n) | Initial state covariance |
| r = 0.1 | Standard deviation of measurement |
| R = $r^2$*eye(n) | Covariance of measurement |

In applying the Kalman smooth filtering equation, processing component 132 may estimate a state of coordinates (x, y, z) and determine a new measurement based on the coordinate (x, y, z) from the previous output. The Kalman smooth filtering equation may reject any noise in the least square sense. The state estimate may be based on each measurement and input. Processing component 132 may then determine a state update from the measurement input. An output may be a coordinate (x, y, z) that is noise free or based on reduced noise.

An output of step 722 may be the final determined position of the detected object, and the output may be used by application controller 142 to effect control of application 140. At a step 724, the (x, y, z) coordinates of gestures may be used to effect control of application 140.

Figure 8:
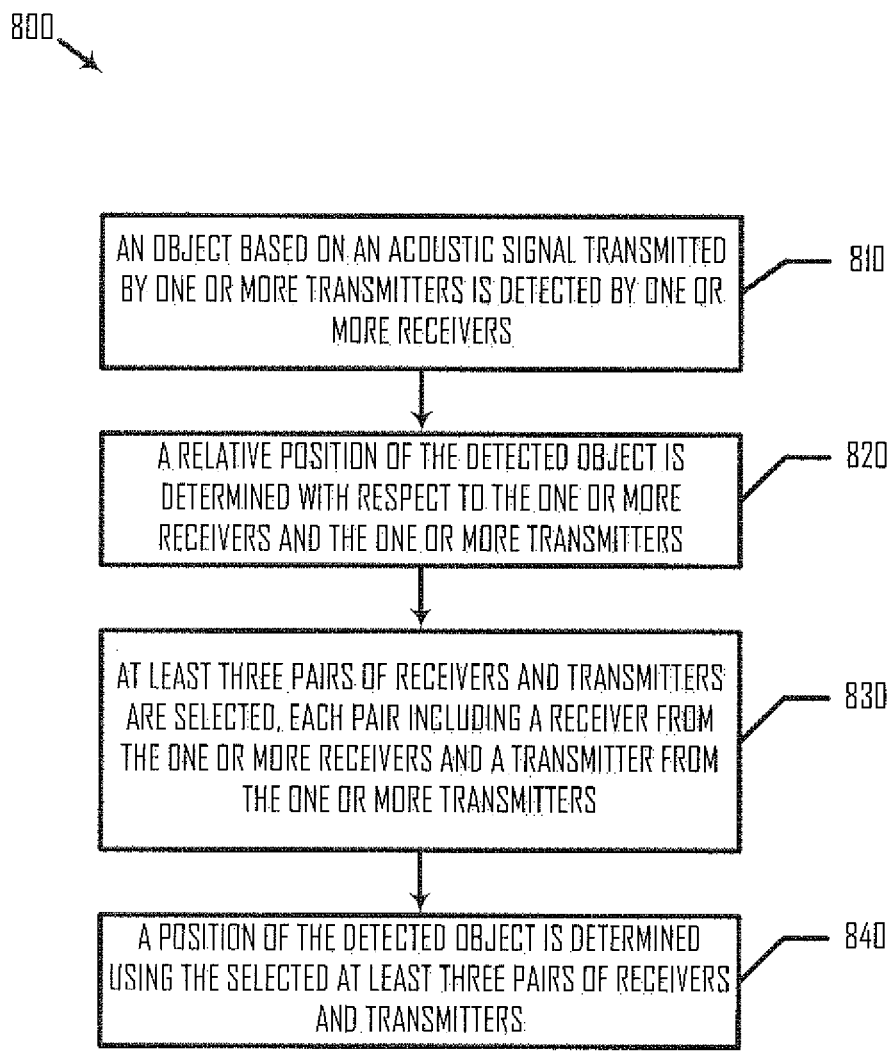
FIG. 8 is a flowchart illustrating a method of determining a position of an object, according to an embodiment.

FIG. 8 is a flowchart illustrating a method 800 of determining a position of an object, according to an embodiment. Method 800 is not meant to be limiting and may be used in other applications.

Method 800 includes steps 810-840. In a step 810, an object based on an acoustic signal transmitted by one or more transmitters is detected by one or more receivers. In an example, receivers 106A, 106, 106C, and/or 106D may detect object 110 based on an acoustic signal transmitted by transmitters 104A and/or 104B.

In a step 820, a relative position of the detected object is determined with respect to the one or more receivers and the one or more transmitters. In an example, processing component 132 determines a relative position of the detected object with respect to receivers 106A, 106, 106C, and/or 106D and transmitters 104A and/or 104B.

In a step 830, at least three pairs of receivers and transmitters are selected, each pair including a receiver from the one or more receivers and a transmitter from the one or more transmitters. In an example, processing component 132 selects at least three pairs of receivers and transmitters, each pair including a receiver from receivers 106A, 106, 106C, and 106D and a transmitter from transmitters 104A and 104B.

In a step 840, a position of the detected object is determined using the selected at least three pairs of receivers and transmitters. In an example, processing component 132 determines a position of the detected object using the selected at least three pairs of receivers and transmitters.

It is also understood that additional method steps may be performed before, during, or after steps 810-840 discussed above. It is also understood that one or more of the steps of method 800 described herein may be omitted, combined, or performed in a different sequence as desired.

Figure 9:
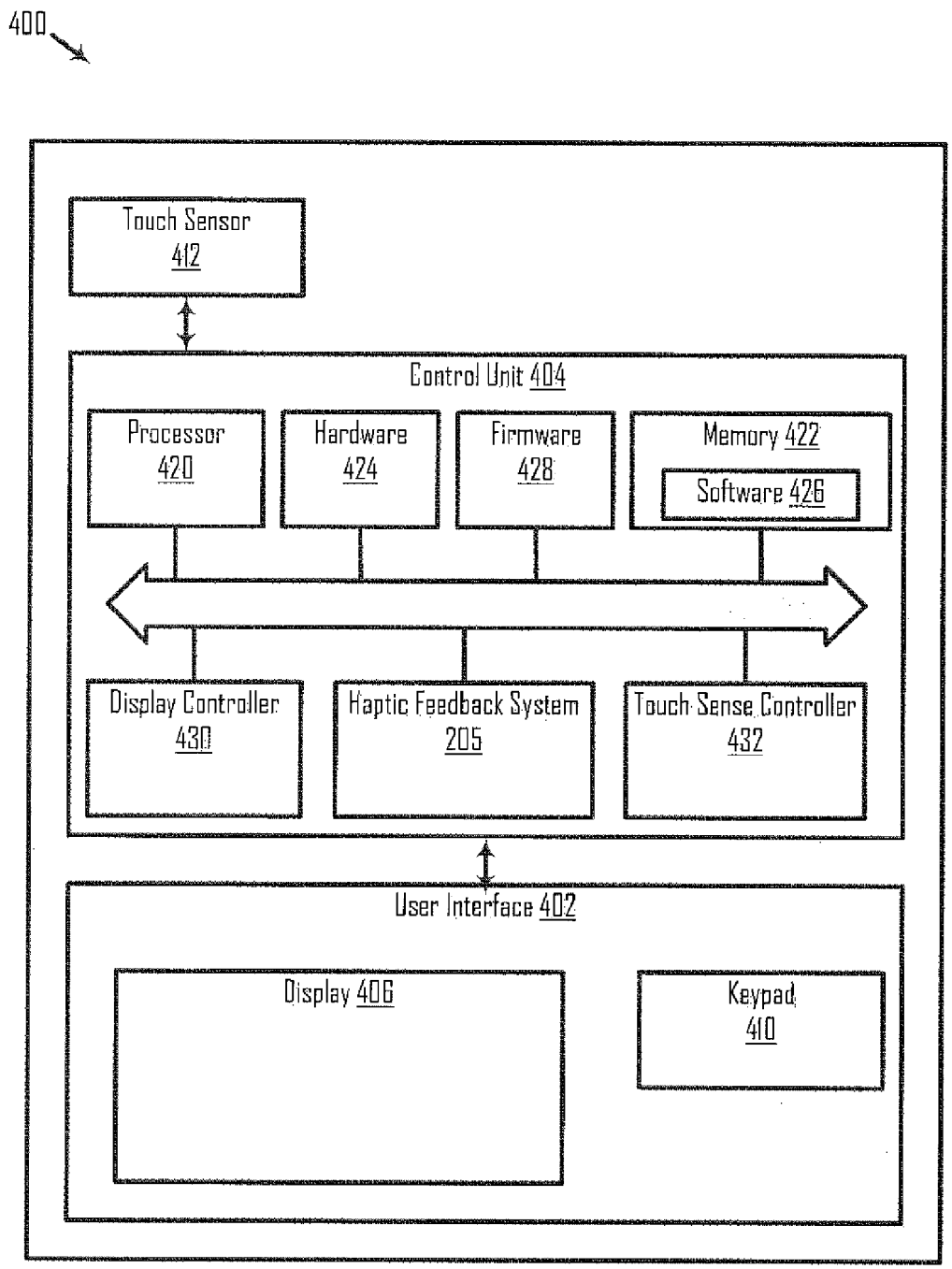
FIG. 9 is a diagram illustrating a platform capable of determining a position of an object, consistent with some embodiments.

FIG. 9 is a diagram illustrating a platform capable of determining a position of an object, consistent with some embodiments.

Computing device 108 may run a platform 900. Platform 900 includes a user interface 902 that is in communication with a control unit 904, e.g., control unit 904 accepts data from and controls user interface 902. User interface 902 includes display 906, which includes a means for displaying graphics, text, and images, such as an LCD or LPD display.

User interface 902 may further include a keypad 910 or other input device through which the user can input information into the platform 900. If desired, keypad 410 may be obviated by integrating a virtual keypad into display 906. It should be understood that with some configurations of platform 900, portions of user interface 902 may be physically separated from control unit 904 and connected to control unit 904 via cables or wirelessly, for example, in a Bluetooth headset. Detector 912 may be used as part of user interface 902 by detecting an object hovering over display 406.

Acoustic tracking system 100 may or may not use the user's touch input information to detect an object based on an acoustic signal. In an example, acoustic tracking system 100 does not use the user's touch input information and may detect an object based on an acoustic signal.

Control unit 904 accepts and processes data from user interface 902 and detector 912 and controls the operation of the devices. Platform 900 may include means for detecting an object based on an acoustic signal transmitted by one or more transmitters. Platform 900 may further include a means for determining a relative position of the detected object with respect to the one or more receivers and the one or more transmitters. Platform 900 may further include a means for selecting at least three pairs of receivers and transmitters, each pair including a receiver from the one or more receivers and a transmitter from the one or more transmitters. Platform 900 may further include a means for determining a position of the detected object using the selected at least three pairs of receivers and transmitters.

Control unit 904 may be provided by one or more processors 920 and associated memory 922, hardware 924, software 926, and firmware 928. Control unit 904 includes a means for controlling display 906, means for controlling detector 912, and means for controlling acoustic tracking system 100, and means for controlling detector controller 932. Display controller 930, detector controller 932, and acoustic tracking system 100 may be implanted in processor 920, hardware 924, firmware 928, or software 926, e.g., computer readable media stored in memory 922 and executed by processor 920, or a combination thereof. Display controller 930, detector controller 932, and acoustic tracking system 100 nevertheless are illustrated separately for clarity.

As discussed above and further emphasized here, FIGS. 1-9 are merely examples that should not unduly limit the scope of the claims. It will also be understood as used herein that processor 920 can, but need not necessarily include, one or more microprocessors, embedded processors, controllers, application specific integrated circuits (ASICs), digital signal processors (DSPs), graphics processing units (GPUs), and the like. The term processor is intended to describe the functions implemented by the system rather than specific hardware. Moreover, as used herein the term "memory" refers to any type of computer storage medium, including long term, short term, or other memory associated with the platform, and is not to be limited to any particular type of memory or number of memories, or type of media upon which memory is stored.

The methodologies described herein may be implemented by various means depending upon the application. For example, these methodologies may be implemented in hardware 924, firmware 928, software 926, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 922 and executed by the processor 920. Memory may be implemented within the processor unit or external to the processor unit.

For example, software 926 may include program codes stored in memory 922 and executed by processor 920 and may be used to run the processor and to control the operation of platform 900 as described herein. A program code stored in a computer-readable medium, such as memory 922, may include program code to detect an object based on an acoustic signal transmitted by one or more transmitters, determine a relative position of the detected object with respect to the one or more receivers and the one or more transmitters, select at least three pairs of receivers and transmitters, each pair including a receiver from the one or more receivers and a transmitter from the one or more transmitters, and determine a position of the detected object using the selected at least three pairs of receivers and transmitters. The program code stored in a computer-readable medium may additionally include program code to cause the processor to control any operation of platform 900 as described further below.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

One skilled in the art may readily devise other systems consistent with the disclosed embodiments which are intended to be within the scope of this disclosure. The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of determining a position of an object, comprising:
   detecting, by one or more receivers, an object based on an acoustic signal transmitted by one or more transmitters;
   determining a relative position of the detected object with respect to the one or more receivers and the one or more transmitters;
   matching the determined relative position of the detected object to a zone among a plurality of zones, assigning a weight to at least one pair of receivers and transmitters based on the matched zone;
   selecting, based in part on the assigned weight, at least three pairs of receivers and transmitters, having a greater assigned weight than another pair, wherein a first weight assigned to a first pair is greater than a second weight assigned to a second pair whenever an error reflection of the detected object relative to the first pair is less than an error reflection of the detected object relative to the second pair, each pair including a receiver from the one or more receivers and a transmitter from the one or more transmitters; and
   determining a three-dimensional coordinate position of the detected object using the selected at least three pairs of receivers and transmitters.

2. The method of claim 1, wherein the determining a three-dimensional coordinate position of the detected object includes applying a least square triangulation equation to the at least three pairs of receivers and transmitters.

3. The method of claim 1, further comprising:
   for each matched zone, determining a zone type of the matched zone, wherein the assigning a weight to at least one pair of the three pairs of receivers and transmitters based on the matched zone includes assigning a weight based on the zone type of the matched zone.

4. The method of claim 1, wherein the detecting includes detecting based on a reflected acoustic signal.

5. The method of claim 1, wherein each zone of the plurality of zones includes at least one receiver and at least one transmitter.

6. The method of claim 1, wherein the acoustic signal is an ultrasound signal.

7. The method of claim 1, wherein the one or more receivers and the one or more transmitters are attached to a mobile device.

8. The method of claim 7, wherein the mobile device is at least one of a smartphone, tablet, personal digital assistant, and laptop.

9. The method of claim 1, wherein the one or more receivers and the one or more transmitters are disposed on a device having a screen.

10. The method of claim 9, wherein the detecting includes detecting the object within a proximity of the screen.

11. The method of claim 9, further comprising:
    affecting operation of an application executing on the device based on the determined position of the object.

12. The method of claim 9, further comprising:
    determining a zone type of a zone of the plurality of zones, wherein the determining a zone type includes applying a first equation:

$$\frac{x-x0}{\cos\alpha} + y'\tan\alpha = x',$$

and
applying a second equation:

$$\frac{y'}{\cos\alpha} + (x-x0)\tan\alpha = y - y0,$$

wherein "x" is an initial x-axis of touch-sensitive screen,
wherein "y" is an initial y-axis of touch-sensitive screen,
wherein (x0, y0) is a coordinate of a center point between the respective receiver and the respective transmitter,
wherein x' is a rotated x-axis that intersects with the respective receiver and the respective transmitter,
wherein y' is a rotated y-axis that is perpendicular to the rotated x'-axis, and
wherein α is a rotation angle between the initial (x, y) axis and the rotated (x', y') axis.

13. The method of claim 12, wherein the determining a zone type further includes applying a third equation:

$$a = \sqrt{d^2+b^2} = \frac{1}{2}(\sqrt{(x'+d)^2+y'^2} + \sqrt{(d-x')^2+y'^2}),$$

applying a fourth equation:

$$c = \sqrt{1 - \frac{y'^2}{b^2}},$$

applying a fifth equation:

$$a'=a*c,$$

applying a sixth equation:

$$b'=b*c,\text{ and}$$

applying a seventh equation:

$$\frac{x'^2}{a^2} + \frac{y'^2}{b^2} = 1,$$

wherein "a" is a distance from a y'-axis to an ellipsoid's horizontal endpoint, "b" is a distance from an x'-axis to the ellipsoid's vertical endpoint, "d" is half the distance between the respective receiver and the respective transmitter, and the ellipsoid intersects a point that is a distance "a" from the y'-axis and a point that is a distance "b" from the x'-axis.

14. The method of claim 13, further comprising:
applying an eighth equation:

$$\frac{(a'-L)^2}{a'^2} + \frac{h^2}{b'^2}$$

wherein when a result of the eighth equation is greater than or equal to one, the zone type is of a first zone type,
when the result of the eighth equation is less than one, the zone type is of a second zone type, and the first zone type has a greater weight than the second zone type,
wherein when |x'|<d, |y'|>Δ(Δ>0), where Δ is an approximate size of a diameter of a port hole of the respective transmitter,
wherein the object is a fingertip of a hand including a palm and a knuckle,
wherein "L" is a width of the palm, and
wherein "h" is a length from the fingertip to the knuckle.

15. The method of claim 14, wherein the hand is a left hand or a right hand.

16. The method of claim 14, further comprising:
determining whether the object is located within a threshold of a boundary between two zones of the first zone type; and
when the object is determined to be located within the threshold of the boundary between two zones of the first zone type, assigning a second weight to at least one pair of receivers and transmitters,
wherein the determining a three-dimensional coordinate position of the detected object includes using the one or more second weights assigned to the at least one pair of receivers and transmitters.

17. The method of claim 16, wherein the determining a three-dimensional coordinate position of the detected object includes applying a weighted least square triangulation equation using the one or more second weights assigned to the at least one pair of receivers and transmitters.

18. The method of claim 17, further comprising:
for a plurality of pairs of receivers and transmitters, determining a z-coordinate output based on the x- and y-coordinates of the three-dimensional coordinate position and further based on a location of the receiver in the respective pair and a location of the transmitter in the respective pair;
identifying a refined z-coordinate having a least change compared to one or more determined z-coordinate outputs; and
updating a z-coordinate of the three-dimensional coordinate position of the detected object with the identified refined z-coordinate.

19. The method of claim 18, wherein the determining a z-coordinate includes applying a ninth equation:

$$R_i=\text{sqrt}[(x_2-x_i)^2+(y_2-y_i)^2+(z-z_i)^2]+\text{sqrt}[(x_2-s_{xi})^2+(y_2-s_{yi})^2+(z-s_{zi})^2],$$

wherein $(x_i, y_i, z_i)$ is equivalent to an $i^{th}$ receiver location,
wherein $(s_{xi}, s_{yi}, s_{zi})$ is equivalent to an transmitter location,
wherein $R_i$ is equivalent to a sum distance of a first distance between a location of the
$i^{th}$ transmitter to the fingertip and a second distance between the fingertip to the $i^{th}$ receiver,
wherein $x_2$ is an x-coordinate of the three-dimensional coordinate position of the detected object, and
wherein $y_2$ is a y-coordinate of the three-dimensional coordinate position of the detected object.

20. The method of claim 18, further comprising:
applying a filter equation to an updated three-dimensional coordinate position; and
determining a filtered three-dimensional coordinate position of the detected object based on applying the filter equation.

21. The method of claim 20, wherein the filter equation is a Kalman Smooth Filtering equation.

22. A system for determining a position of an object, comprising:

one or more receivers that detect an object based on an acoustic signal transmitted by one or more transmitters; and
a processing component that
determines a relative position of the detected object with respect to the one or more receivers and the one or more transmitters, matches the relative position of the detected object to a zone among a plurality of zones, assigns a weight to at least one pair of receivers and transmitters based on the matched zone;
selects, based in part on the assigned weight, at least three pairs of receivers and transmitters, having a greater assigned weight than another pair, wherein a first weight assigned to a first pair is greater than a second weight assigned to a second pair whenever an error reflection of the detected object relative to the first pair is less than an error reflection of the detected object relative to the second pair, and
determines a three-dimensional coordinate position of the detected object using the selected at least three pairs of receivers and transmitters, wherein each selected pair includes a receiver from the one or more receivers and a transmitter from the one or more transmitters.

23. The system of claim 22, wherein the processing component applies a least square triangulation equation to the at least three pairs of receivers and transmitters.

24. The system of claim 22, wherein the processing component assigns a weight to at least one pair of the three pairs of receivers and transmitters based on a zone type of the matched zone.

25. The system of claim 22, wherein the one or more receivers and the one or more transmitters are disposed on a device having a screen, and the processing component determines the relative position of the object with respect to the screen.

26. The system of claim 25, further comprising:
an application controller that affects operation of an application executing on the device based on the determined three-dimensional coordinate position of the object.

27. The system of claim 22, wherein the processing component determines whether the object is located within a threshold of a boundary between two zones of a first zone type, wherein when the object is determined to be located within the threshold of the boundary between two zones of the first zone type, the processing component assigns a second weight to at least one pair of receivers and transmitters, and wherein a locator determines the three-dimensional coordinate position of the detected object using the one or more second weights assigned to the at least one pair of receivers and transmitters.

28. The system of claim 27, wherein the processing component determines the three-dimensional coordinate position of the detected object by applying a weighted least square triangulation equation using the one or more second weights assigned to the at least one pair of receivers and transmitters.

29. The system of claim 28, wherein for a plurality of pairs of receivers and transmitters, the processing component determines a z-coordinate output based on the x- and y-coordinates of the three-dimensional coordinate position and further based on a location of the receiver in the respective pair and a location of the transmitter in the respective pair, and wherein the processing component identifies a refined z-coordinate having a least change compared to one or more determined z-coordinate outputs and updates a z-coordinate of the three-dimensional coordinate position of the detected object with the identified refined z-coordinate.

30. The system of claim 29, wherein the processing component applies an equation equivalent to:

$$R_i = \text{sqrt}[(x_2-x_i)^2+(y_2-y_i)^2+(z-z_i)^2]+\text{sqrt}[(x_2-s_{xi})^2+(y_2-s_{yi})^2+(z-s_{zi})^2],$$

wherein $(x_i, y_i, z_i)$ is a location of an $i^{th}$ receiver,
wherein $(s_{xi}, s_{yi}, s_{zi})$ is a location of an $i^{th}$ transmitter,
wherein $R_i$ is equivalent to a sum distance of a first distance between the location of the $i^{th}$ transmitter to the fingertip and a second distance between the fingertip to the location of the $i^{th}$ receiver,
wherein $x_2$ is an x-coordinate of the three-dimensional coordinate position of the detected object, and
wherein $y_2$ is a y-coordinate of the three-dimensional coordinate position of the detected object.

31. The system of claim 29, wherein the processing component applies a filter equation to an updated three-dimensional coordinate position and determines a filtered three-dimensional coordinate position of the detected object.

32. The system of claim 31, wherein the processing component applies a Kalman Smooth Filtering equation.

33. The system of claim 22, wherein the one or more receivers and the one or more transmitters are attached to a mobile device.

34. The system of claim 33, wherein the mobile device is at least one of a smartphone, tablet, personal digital assistant, and laptop.

35. A non-transitory computer-readable medium having stored thereon computer-executable instructions for performing operations, comprising:
detecting an object based on an acoustic signal transmitted by one or more transmitters;
determining a relative position of the detected object with respect to the one or more receivers and the one or more transmitters;
matching the determined relative position of the detected object to a zone among a plurality of zones,
assigning a weight to at least one pair of receivers and transmitters based on the matched zone;
selecting, based in part on the assigned weight, at least three pairs of receivers and transmitters, having a greater assigned weight than another pair, wherein a first weight assigned to a first pair is greater than a second weight assigned to a second pair whenever an error reflection of the detected object relative to the first pair is less than an error reflection of the detected object relative to the second pair, each pair including a receiver from the one or more receivers and a transmitter from the one or more transmitters; and
determining a three-dimensional coordinate position of the detected object using the selected at least three pairs of receivers and transmitters.

36. A system for determining a position of an object, comprising:
means for detecting an object based on an acoustic signal transmitted by one or more transmitters;
means for determining a relative position of the detected object with respect to the one or more receivers and the one or more transmitters;
means for matching the determined relative position of the detected object to a zone among a plurality of zones;
means for assigning a weight to at least one pair of receivers and transmitters based on the matched zone;
means for selecting, based in part on the assigned weight, at least three pairs of receivers and transmitters, having a greater assigned weight than another pair, wherein a first weight assigned to a first pair is greater than a second weight assigned to a second pair whenever an error reflection of the detected object relative to the first pair is less than an error reflection of the detected object relative to the second pair, each pair including a receiver from the one or more receivers and a transmitter from the one or more transmitters; and means for determining a three-dimensional coordinate position of the detected object using the selected at least three pairs of receivers and transmitters.

\* \* \* \* \*